Patented May 12, 1942

2,282,754

UNITED STATES PATENT OFFICE 2,282,754

STABLE DRY PREPARATION FOR DIAGNOSTIC PURPOSES OF A BIOLOGICAL ANTIGEN EXTRACT AND A SUBSTANCE CAPABLE OF FORMING A BLOOD ISOTONIC SOLUTION

Friedrich-Wilhelm Bickert, Maribor - on - the-Lahn, Germany, assignor to Winthrop Chemical Company, Inc., New York, N. Y., a corporation of New York No Drawing. Application February 5, 1938, Serial No. 188,927. In Germany February 6, 1937

5 Claims. (Cl. 167—78)

The present invention relates to a process of preparing stable dry preparations.

If the extracts prepared from normal organs and the organs of infected animals or from the cultures of excitants of disease by using organic solvents are dried, precipitates are obtained which redissolve relatively sparingly and which cannot directly be transformed into the aqueous solutions and suspensions wherein they shall be applied later on for the prepartion of diagnostic reactions, for instance of the method of fixing the complement.

Now I have found that precipitates which readily dissolve or suspend in water may be obtained by adding small amounts of salts or other suitable substances to the extracts before drying them. The additions may also be made during the evaporation process as long as sufficient solvent water is still present which guarantees their homogeneous distribution in the final product. The additions may be applied in such quantities that the final aqueous suspension is isotonic with body fluids. A further surprising effect of this drying of the extracts while previously adding salts is the fact that the aqueous suspensions resulting therefrom directly have the special degree of dispersion necessary for the application of the reagent. If there is started, as it has hitherto been usual, for instance, from alcoholic extracts from organs or bacteria which are then diluted with physiological sodium chloride solution the desired degree of dispersion and turbidity is only obtained if the physiological sodium chloride solution is added in quite a certain interval drop by drop. By too rapid or too slow an addition of this solution, solutions are obtained which either are not optimal or even useless. By starting, however, from the extracts dried according to the present process and then adding the water necessary for obtaining the suspension there is always directly obtained the desired optimal degree of dispersion.

Instead of sodium chloride also other salts or chemicals, for instance urea, mannite, sugar or the like may be added to the extracts prepared from the various starting materials while using organic solvents, but care must be taken that always such quantities are applied as later on yield together with the necessary dispersion liquid a blood isotonic solution. There may, of course, be used the most different salts and organic compounds so far as they are capable to form blood isotonic solutions when they are dissolved in distilled water and so far as they do not disturb the method of fixing the complement.

It has already been tried to stabilize immune serum by adding such a quantity of pulverized sodium sulfate that the entire quantity of water is bound in the form of water of crystallization. Furthermore, there have already been solidified liquid substances containing water, for instance coffee extracts, tea extracts or fruit juices, by adding great quantities of anhydrides of the milk sugar. With these two processes, however, there cannot be attained the effect of the process of this invention; especially the preparations obtained according to the known processes have not the valuable property to yield suspensions by the addition of water which suspensions have the special degree of dispersion necessary for the use as reagent; furthermore, the extremely high content of sodium sulfate or milk sugar allows the formation of blood isotonic solutions only in so strong a dilution of the dry preparation that the active constituents of the extracts can no longer have any effect in consequence of the extraordinarily strong dilution.

The following examples serve to illustrate the invention but they are not intended to limit it thereto:

(1) 1.350 grams of sodium chloride or 2.655 grams of urea or 8.055 grams of mannite are added to 30 cc. of an extract, usual for the Wassermann-reaction, from normal beef hearts or from syphilitic liver. The entire liquid is then evaporated to dryness on the water bath. The stable dry preparation is filled into suitable receptacles.

(2) 0.018 gram of sodium chloride or 0.0354 gram of urea or 0.1074 gram of mannite are added to 1 cc. of a bacterial extract, for instance of the tuberculosis-antigen according to Witebsky, dissolved in benzene. Methods of preparing the tuberculosis-antigen of Witebsky are described in "Zentralblatt fuer Bacteriologie, Parasitenkunde und Infektionskrankheiten," 1931, I. Abteilung, 122, pages 65–67 and "Medizinische Klinik," vol. 28, p. 689 et seq., May 13, 1932. The whole is then dried under reduced pressure in the usual manner and filled into suitable receptacles.

I claim:

1. A stable dry preparation useful for diagnostic purposes and readily soluble or suspensible in water which comprises a biological antigen extract applicable in the method of fixing the complement and substantially insoluble in water selected from the group consisting of organic solvent extracts from animal hearts, livers and excitants of disease, and a water-soluble, physiologically indifferent substance capable of forming a blood isotonic solution in such a quantity as to yield a blood isotonic solution together with the dispersion liquid for the preparation, said preparation being obtained by adding such substance to the organic solvent extract, and drying the mixture.

2. The preparation described in claim 1 in which the water-soluble, physiologically indifferent substance is urea.

3. The preparation described in claim 1 in which the water-soluble, physiologically indifferent substance is mannite.

4. The preparation described in claim 1 in which the water-soluble, physiologically indifferent substance is sodium chloride.

5. The composition defined in claim 1, wherein said antigen extract is a bacterial extract of the tuberculosis antigen according to Witebsky and wherein said water-soluble, physiologically indifferent substance is urea, and wherein the organic solvent of the extract is benzene.

FRIEDRICH-WILHELM BICKERT.